US007395127B2

(12) United States Patent
Terada et al.

(10) Patent No.: US 7,395,127 B2
(45) Date of Patent: Jul. 1, 2008

(54) SIGNAL PROCESSING APPARATUS WITH AUTOMATIC CHANNEL NAMING AND NUMBERING

(75) Inventors: Kotaro Terada, Hamamatsu (JP); Akio Suyama, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 729 days.

(21) Appl. No.: 10/641,443

(22) Filed: Aug. 14, 2003

(65) Prior Publication Data

US 2004/0032961 A1 Feb. 19, 2004

(30) Foreign Application Priority Data

Aug. 19, 2002 (JP) ............................ 2002-237857

(51) Int. Cl.
*G06F 17/00* (2006.01)

(52) U.S. Cl. ......................................... 700/94; 381/119

(58) Field of Classification Search ................. 381/119; 700/94; 84/625, 660, 697; 715/716, 727; 369/1, 4

See application file for complete search history.

(56) References Cited

U.S. PATENT DOCUMENTS 5,444,676 A * 8/1995 Balsamo et al. ................ 369/4
5,608,807 A 3/1997 Brunelle
5,757,941 A * 5/1998 McMillen ................... 381/119
6,728,382 B1 * 4/2004 Silfvast ...................... 381/119
2002/0025051 A1 * 2/2002 Kohno et al. ................ 381/119
2002/0156547 A1 * 10/2002 Suyama et al. ................ 700/94
2003/0007652 A1 1/2003 Kohyama et al.

OTHER PUBLICATIONS

Roland: VM-C7200/C7100 Owner's Manual, c 1999 , Roland Corporation, p. 1,5-9,11-14,17-19,22,67,83,89,93-94.*

Kostek, Bozena and Czyzewski, Andrzej, "Representing Musical Instrument Sounds for Their Automatic Classification" Sep. 2001, Journal of the Audio Engineering Society vol. 49 pp. 768-785.*

* cited by examiner

*Primary Examiner*—Vivian Chin
*Assistant Examiner*—Jason Kurr
(74) *Attorney, Agent, or Firm*—Morrison & Foerster LLP

(57) ABSTRACT

There is provided a signal processing apparatus that is capable of giving terminal names which are the most suitable for processing on signals. A plurality of kinds of signals are externally input via a plurality of input terminals of an input terminal group. Processing is performed on the plurality of kinds of signals to generate a signal for at least one channel. The signal for the at least one channel is externally output via a plurality of output terminals of an output terminal group. A plurality of effective terminals included in at least one of the input terminal group and the output terminal group are automatically numbered.

12 Claims, 7 Drawing Sheets

SIGNAL PROCESSING APPARATUS WITH AUTOMATIC CHANNEL NAMING AND NUMBERING

BACKGROUND OF THE INVENTION

1. Field of the Invention

The present invention relates to a signal processing apparatus that performs signal processing on signals of a plurality of channels, which are externally input via a plurality of input terminals, and then outputs the resulting signals externally via a plurality of output terminals, a method of controlling the signal processing apparatus, and a program for implementing the method. More particularly, the present invention relates to a signal processing apparatus that is capable of giving names to the input and output terminals, a method of controlling the signal processing apparatus, and a program for implementing the method.

2. Description of the Related Art

Conventionally, a mixing apparatus (mixer), for example, is known as a signal processing apparatus that performs signal processing on signals of a plurality of channels, which are externally input via a plurality of input terminals, and then outputs the resulting signals externally via a plurality of output terminals.

The mixing apparatus performs various kinds of signal processing, such as level adjustment and application of effects, on signals of a plurality of channels, which are externally input via a plurality of input terminals, mixes the input signals in accordance with an instruction given from the user, and outputs the resulting mixed signals externally via a plurality of output terminals.

Some mixing apparatuses of this kind are configured such that a plurality of units into which a plurality of cards each having at least one input terminal can be inserted constitute a plurality of input terminals (or a plurality of output terminals), and the number and arrangement of the input and output terminals can be freely set by arbitrarily selecting the number of units, the number of cards to be inserted into the units, and so forth.

In general, such mixing apparatuses are capable of giving names to the respective input and output terminals. The names designated by the user are given as they are to the input and output channels, or are automatically given to the input and output terminals in accordance with predetermined rules. In the latter case, i.e., in the case where the names are automatically given, the names are given based on the physical positions of the respective terminals. Specifically, in the case of giving a name to a certain terminal, information indicative of a unit and a card to which the terminal belongs as well as the position of the terminal in the card are added to the name at least indirectly.

In the conventional signal processing apparatus as above, however, in the case where names are automatically given to the respective terminals, information based on the physical positions of the respective terminals are added to the names at least indirectly, and therefore, when performing processing on signals, the user needs to correctly recognize which input signal is input via an input terminal at which position and which output signal is output via an output terminal at which position, but the user may feel it inconvenient to correctly recognize input and output terminals for the respective input signals when processing is actually performed on the signals.

SUMMARY OF THE INVENTION

It is therefore an object of the present invention to provide a signal processing apparatus that is capable of giving terminal names which are the most suitable for processing on signals, a method of controlling the signal processing apparatus, and a program for implementing the method.

To attain the above object, in a first aspect of the present invention, there is provided a signal processing apparatus comprising an input terminal group that comprises a plurality of input terminals via which a plurality of kinds of signals are externally input, a signal processing device that performs processing on the plurality of kinds of signals externally input via the input terminal group to generate a signal for at least one channel, an output terminal group that comprises a plurality of output terminals via which the signal for the at least one channel generated by the signal processing device is externally output, a numbering device that automatically numbers a plurality of effective terminals included in at least one of the input terminal group and the output terminal group.

To attain the above object, the first aspect of the present invention also provides a method of controlling a signal processing apparatus which comprises an input terminal group comprising a plurality of input terminals via which a plurality of kinds of signals are externally input, a signal processing device that performs processing on the plurality of kinds of signals externally input via the input terminal group to thereby generate a signal for at least one channel, an output terminal group that comprises a plurality of output terminals via which the signal for the at least one channel generated by the signal processing device is externally output, the method comprising a numbering step of automatically numbering a plurality of effective terminals included in at least one of the input terminal group and the output terminal group.

To attain the above object, the first aspect of the present invention further provides a program for causing a computer to execute the above method.

According to the first aspect of the present invention, effective ones of the terminals included in at least one of the input terminal group and the output terminal group are numbered, i.e., effective ones of the terminals are simply sequentially numbered, with information indicative of the physical positions of the respective terminals being excluded. As a result, it is possible to give terminal names which are the most suitable for processing to be performed on signals.

Preferably, the signal processing apparatus comprises a main body, a plurality of input terminal set devices including the input terminal group, a plurality of output terminal set devices including the output terminal group, and the plurality of input terminal set devices and the plurality of output terminal set devices are removably attached to the main body.

Preferably, the plurality of effective terminals comprise terminals that are enabled to actually perform external inputting of signals or external outputting of signals.

Preferably, the signal processing apparatus further comprises a display device that displays results of numbering by the numbering device.

To attain the above object, in a second aspect of the present invention, there is provided a signal processing apparatus comprising an input terminal group that comprises a plurality of input terminals via which a plurality of kinds of signals are externally input, an assigning device that assigns each of the plurality of kinds of signals input via the input terminal group to one input channel, a signal processing device that performs processing on signals assigned to a plurality of input channels by the assigning device to thereby generate a signal for at least one output channel, an output terminal group that comprises a plurality of output terminals via which the signal for the at least one output channel generated by the signal processing device is externally output, a terminal naming device that gives names to a plurality of effective terminals included in at least one of the input terminal group and the output terminal group such that the terminals are distinguished from each other by the names, a channel naming device that gives names to respective ones of the input channels or output channels, a display device that displays the names given by the channel naming device in a manner being associated with respective ones of the input channels or output channels, a display control device that provides control such that the names given by the terminal naming device to the effective terminals, and the names given to the input channels or output channels by the channel naming device are switchably displayed on the display device.

To attain the above object, the second aspect of the present invention also provides a method of controlling a signal processing apparatus which comprises an input terminal group comprising a plurality of input terminals via which a plurality of kinds of signals are externally input, an assigning device that assigns each of the plurality of kinds of signals input via the input terminal group to one input channel, a signal processing device that performs processing on signals assigned to a plurality of input channels by the assigning device to thereby generate a signal for at least one output channel, and an output terminal group that comprises a plurality of output terminals via which the signal for the at least one output channel generated by the signal processing device is externally output, the method comprising a terminal naming step of giving names to a plurality of effective terminals included in at least one of the input terminal group and the output terminal group such that the terminals are distinguished from each other by the names, a channel naming step of giving names to respective ones of the input channels or output channels, a display step of displaying the names given in the channel naming step on a display device in a manner being associated with respective ones of the input channels or output channels, and a display control step of providing control such that the names given in the terminal naming step to effective terminals, and the names given to the input channels or output channels in the channel naming step are switchably displayed on the display device.

To attain the above object, the second aspect of the present invention further provides a program for causing a computer to execute the above method.

According to the second aspect of the present invention, the names given to the effective terminals, and the names given to the input channels or output channels are switchably displayed on the display device. As a result, it is possible to identify the channels and terminals corresponding to signals assigned to the channels at a glance.

Preferably, the signal processing apparatus comprises a main body, a plurality of input terminal set devices including the input terminal group, a plurality of output terminal set devices including the output terminal group, and the plurality of input terminal set devices and the plurality of output terminal set devices are removably attached to the main body.

Preferably, the terminal naming device gives names designated by a user to the effective terminals.

Preferably, the terminal naming device automatically numbers the effective terminals.

To attain the above object, in a third aspect of the present invention, there is provided a signal processing apparatus comprising an input terminal group that comprises a plurality of input terminals via which a plurality of kinds of signals are externally input, a signal processing device that performs processing on the plurality of kinds of signals input via the input terminal group to thereby generate a signal for at least one channel, an output terminal group that comprises a plurality of output terminals via which the signal for the at least one channel generated by the signal processing device is externally output, and a naming device that gives generic names to respective ones of the input terminal group and the output terminal group, and a display device that displays the names given by the naming device.

To attain the above object, the third aspect of the present invention also provides a method of controlling a signal processing apparatus which comprises an input terminal group comprising a plurality of input terminals via which a plurality of kinds of signals are externally input, a signal processing device that performs processing on the plurality of kinds of signals input via the input terminal group to thereby generate a signal for at least one channel, an output terminal group that comprises a plurality of output terminals via which the signal for the at least one channel generated by the signal processing device is externally output, the method comprising a naming step of giving generic names to respective ones of the input terminal group and the output terminal group, and a display step of displaying the names given by the naming device on a display device.

To attain the above object, the third aspect of the present invention further provides a program for causing a computer to execute the above method.

According to the third aspect of the present invention, generic names are given to respective ones of the input terminal group and the output terminal group and are displayed on the display device. As a result, by giving names representative of, for example, the functions, of each terminal group, it is possible to recognize the functions of each terminal group at a glance.

Preferably, the signal processing apparatus comprises a main body, a plurality of input terminal set devices including the input terminal group, a plurality of output terminal set devices including the output terminal group, and the plurality of input terminal set devices and the plurality of output terminal set devices are removably attached to the main body.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
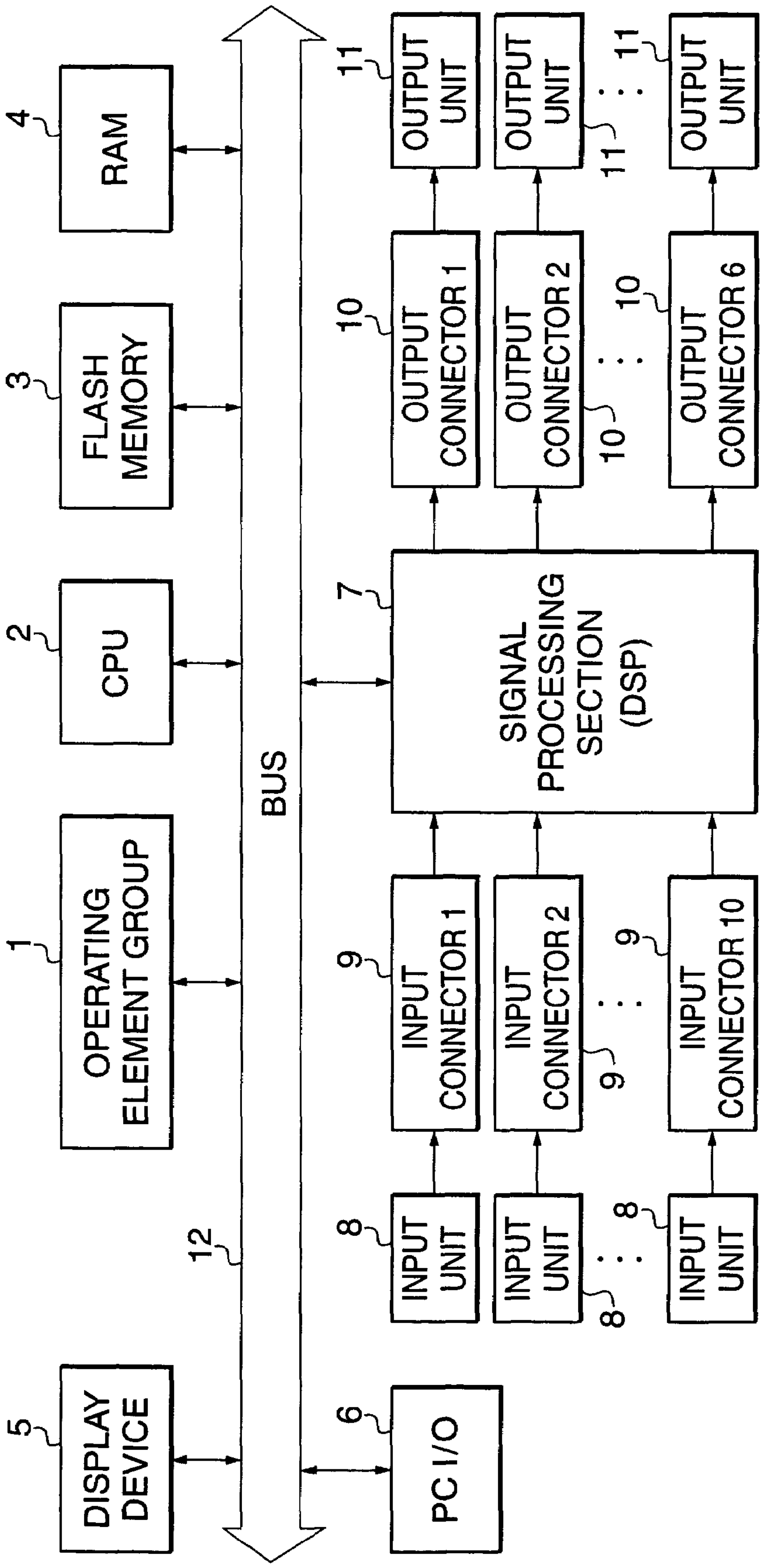
FIG. 1 is block diagram schematically showing the construction of a signal processing apparatus according to a first embodiment of the present invention.

FIG. 1 is a block diagram schematically showing the construction of a signal processing apparatus according to a first embodiment of the present invention, which is applied to a mixing apparatus.

As shown in FIG. 1, the signal processing apparatus according to the present embodiment is comprised mainly of an operating element group 1 consisting of a plurality of operating elements such as faders (refer to FIG. 5) which are used for adjusting the signal levels of input signals or output signals, a display change-over switch (refer to FIG. 5) which is used for switching screen views, and an operating element, not shown, which is used for moving a cursor being displayed (refer to FIG. 3); a CPU 2 that controls the overall operation of the signal processing apparatus; a flash memory 3 that stores various control programs to be executed by the CPU 2, various kinds of table data, and so forth; a RAM 4 that temporarily stores various input information and calculation results; a display device 5 which is used for displaying various information and is comprised of, for example, a liquid crystal display (LCD), a light emitting diode (LED), and so forth; an input/output interface (PCI/O) 6 that provides interface for transmitting and receiving data to and from an external personal computer (PC); and a signal processing section 7 that performs various kinds of signal processing on input signals and externally outputs the resulting signals. These component parts 1-7 are connected to each other via a bus 12.

A plurality of (ten in the illustrated example) input connectors 9 are connected to the input of the signal processing section 7, and one input unit 8 can be connected to each of the input connectors 9. Similarly, a plurality of (six in the illustrated example) output connectors 10 are connected to the output of the signal processing section 7, and one output unit 11 can be connected to each of the output connectors 10.

Each of the input units 8 is formed with slots, not shown, into which a plurality of (e.g. eight) input cards, not shown, can be inserted. Each of the input cards is provided with a plurality of (e.g. four) input ports (signal input terminals) so that signals (analog signals or digital signals) can be input via the input ports. As described later, the user can select his/her desired type from among various types (functions) of input cards prepared in advance.

Similarly, each of the output units 11 is formed with slots, not shown, into which a plurality of (e.g. eight) output cards, not shown, can be inserted. Each of the output cards is provided with a plurality of (e.g. four) output ports (signal output terminals) so that signals (analog signals or digital signals) can be output via the output ports. As described later, the user can select his/her desired type from among various types (functions) of output cards prepared in advance.

In the present embodiment, it is configured such that both the number of input cards and the number of output cards can be changed, i.e., it is configured such that both the number of input ports and the number of output ports can be changed, but it may be configured such that only either the number of input ports or the number of output ports can be changed.

Figure 2:
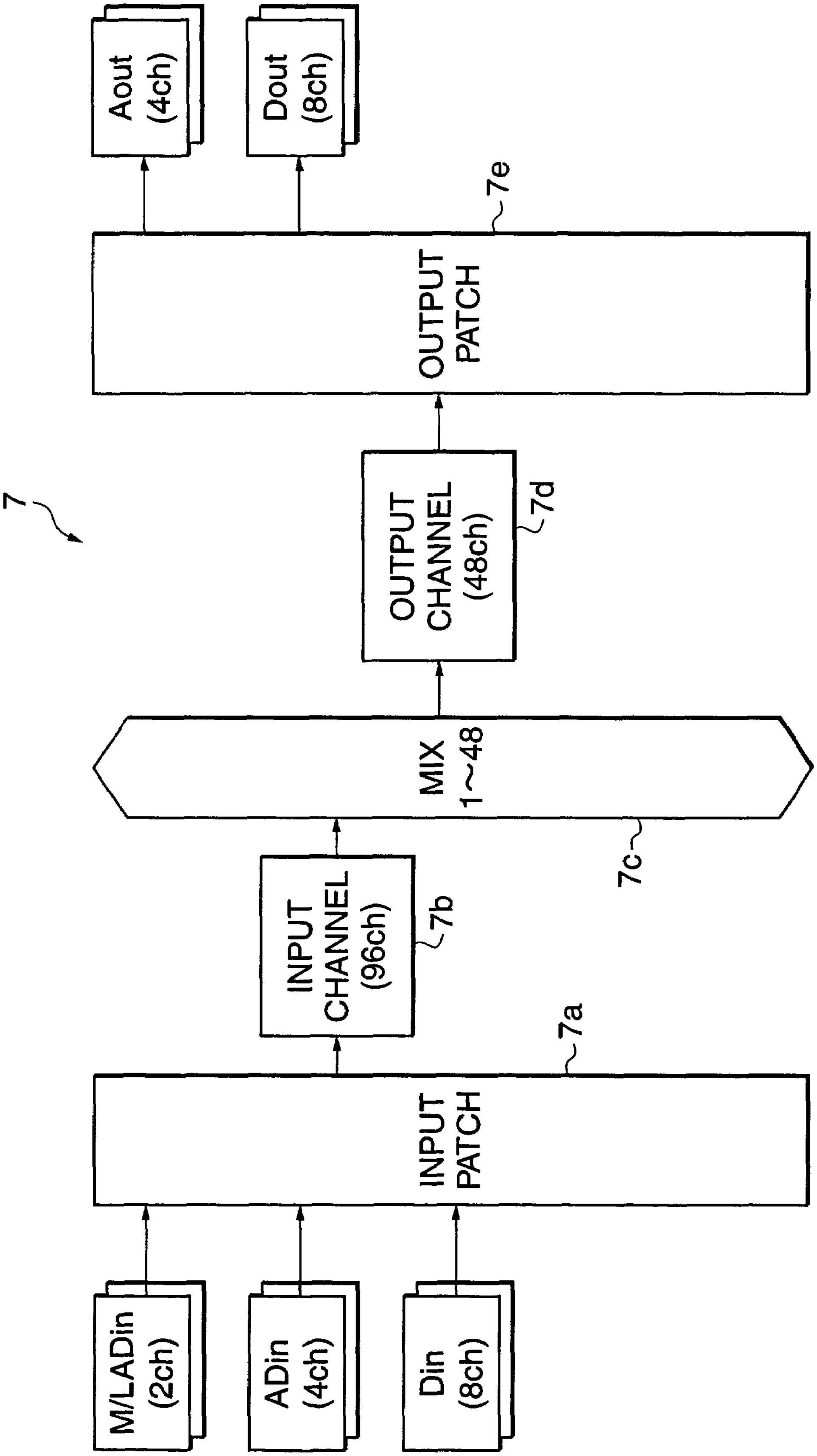
FIG. 2 is a block diagram showing the detailed construction of a signal processing section appearing in FIG. 1.

FIG. 2 is a block diagram showing the detailed construction of the signal processing section 7.

As shown in FIG. 2, the signal processing section 7 is comprised mainly of an input patch section 7*a*, an input channel (ch) section 7*b*, a mixing (MIX) section 7*c*, an output channel (ch) section 7*d*, and an output patch section 7*e*.

A variety of signals are input to the input patch section 7*a* via the respective ports of the input cards inserted into the input units 8.

As the input cards, a plurality of (e.g. three) types are prepared in advance. Specifically, the following three types are prepared: (1) a type in which two of the four ports are designated for inputting signals via analog microphones and the other two of them are designated for inputting signals via analog lines, and which is configured such that the former ports (i.e. analog microphone input ports) and the latter ports (i.e. analog line input ports) are switched to each other in an exclusive manner so that analog signals of up to two channels can be input at the same time and converted to digital signals (M/LADin); (2) a type which receives an analog signal of one channel via each of the four ports thereof so that analog signals of up to four channels can be input and converted to digital signals (A/Din); and (3) a type which receives a digital signal of one channel via each of the four ports thereof, and outputs each digital signal to two channels so that digital signals of up to eight channels can be output (Din).

As described above, although the input cards differ in number of channels, in which signals can be input, according to their types, the number of ports is always four irrespective of the types of the input cards. Therefore, the maximum number of input ports provided in the apparatus is expressed by: four ports (the number of input ports per input card)×8 (the number of input cards that can be inserted into one input unit)×10 (the number of input units that can be connected to the apparatus)=320 ports.

Although in the present embodiment, the number of input ports provided in each input card is fixed, i.e. four irrespective of the type thereof, it goes without saying that the number of input ports may differ according to the types of the input cards.

The input patch section 7*a* assigns (connects) input signals to respective channels of the input channel section 7*b*.

The input channel section 7*b* is comprised of limiters, compressors, equalizers, faders, pans, a destination selecting section, an output level adjusting section, none of which is not illustrated, and so forth, and is capable of performing processing on signals of up to ninety-six channels. The destination selecting section selects any of a plurality of (e.g. forty-eight) channels of the mixing section 7*c* as the destination of a signal of each channel in accordance with an instruction from the user.

The mixing section 7*c* mixes a plurality of signals for which the same channel has been selected by the destination selecting section, and outputs the resulting mixed signal to the output channel section 7*d*.

The output channel section 7*d* is comprised of limiters, compressors, equalizers, faders, and so forth, and is capable of performing processing on signals of up to forty-eight channels.

The signals output from the output channel section 7*d* are delivered to the output patch section 7*e*. The output patch section 7*e* delivers the signals of the respective channels to the respective output ports of the output cards inserted into the output units 11.

As the output cards, a plurality of (e.g. two) types are prepared in advance. Specifically, the following two types are prepared: (1) a type which converts digital signals of up to four channels to respective analog signals at the same time, and outputs each analog signal of one channel via each of the four ports thereof (Aout); and (2) a type which outputs a digital signal of one channel via each of the four ports, and outputs each digital signal to two channels, thereby outputting digital signals of up to eight channels at the same time (Dout).

As described above, although the output cards differ in number of channels, in which signals can be output, according to their types, the number of ports is always four irrespective of the types of the output cards. Therefore, the maximum number of output ports provided in the apparatus is expressed by: four ports (the number of output ports per output card)×8 (the number of output cards that can be inserted into one output unit)×6 (the number of output units that can be connected to the apparatus)=192 ports.

Although in the present embodiment, the number of output ports provided in each output card is fixed, i.e. four irrespective of the type thereof, it goes without saying that the number of output ports may differ according to the types of output cards.

Although in the present embodiment, it is assumed that the present invention is applied to the mixing apparatus, the present invention may be applied to any other apparatuses insofar as they are equipped with a plurality of input/output terminals and adapted to perform processing on input signals of a plurality of channels, which are input via a plurality of input terminals, and externally output the resulting signals.

Figure 3:
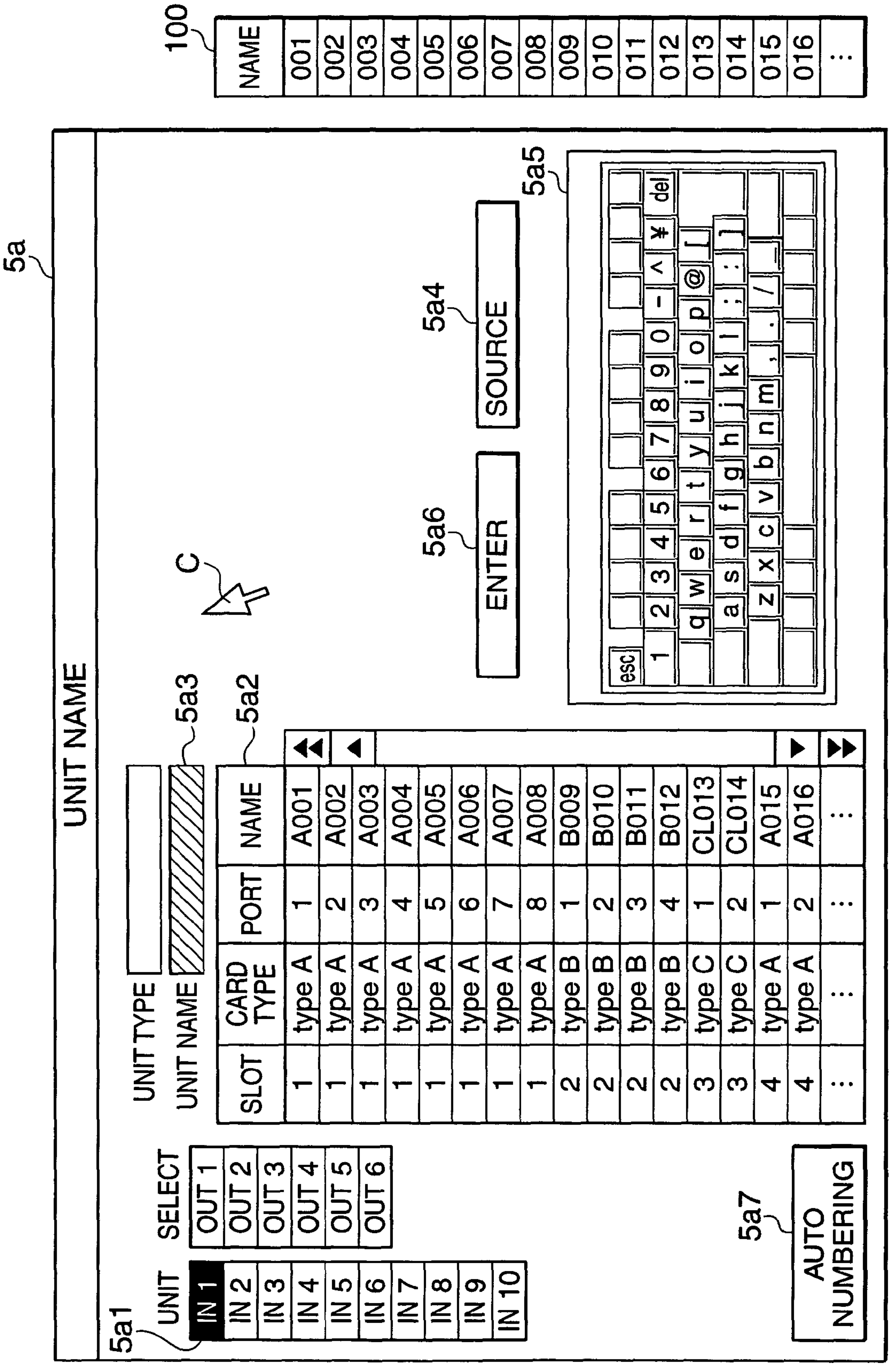
FIG. 3 is a view showing an example of a screen view used for giving various names, which is displayed on a display appearing in FIG. 1.
Figure 4A:
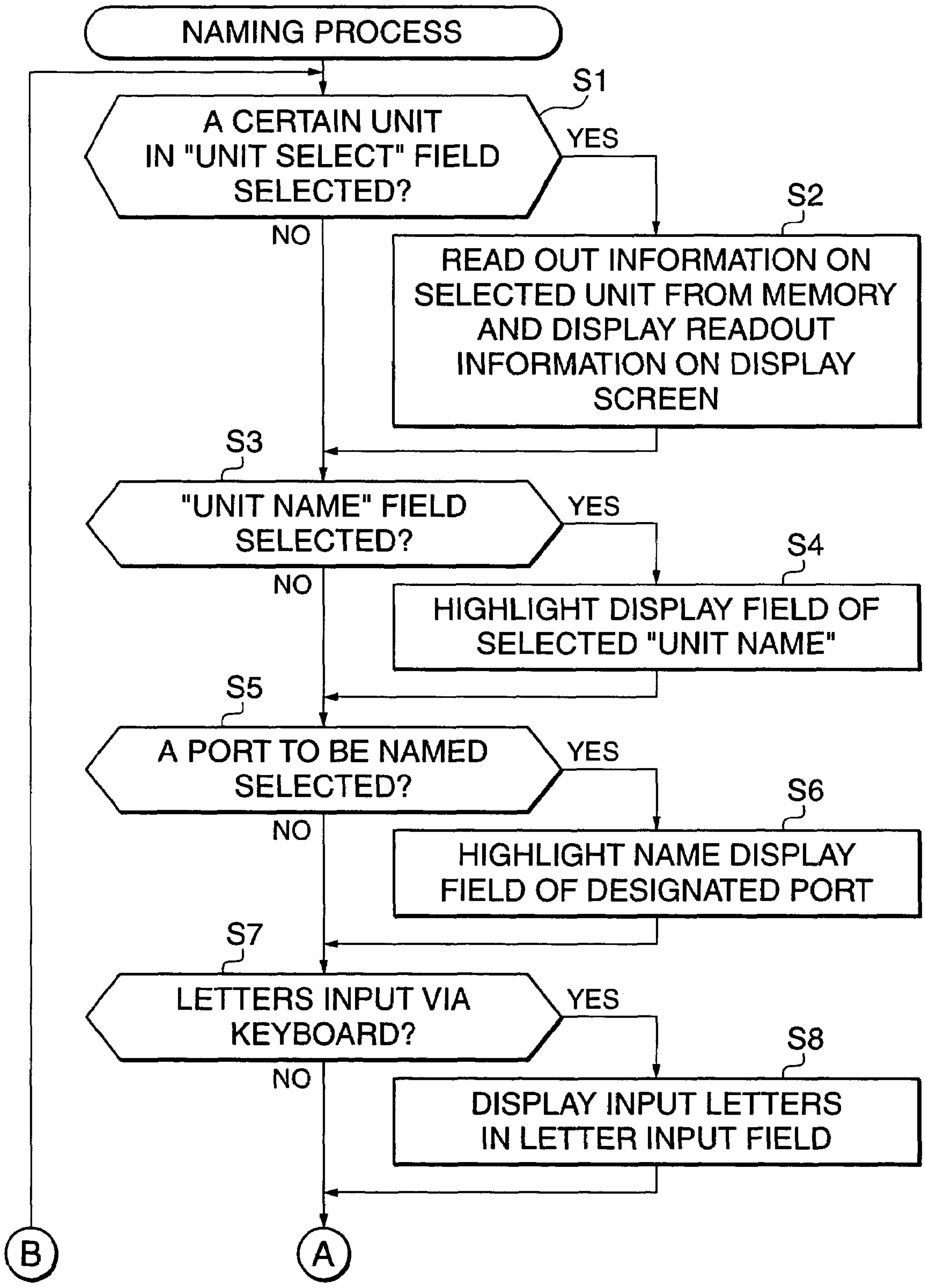
FIGS. 4A-4B are flow chart showing a naming process which is executed by the signal processing apparatus, and more particularly, by a CPU appearing in FIG. 1.
Figure 4B:
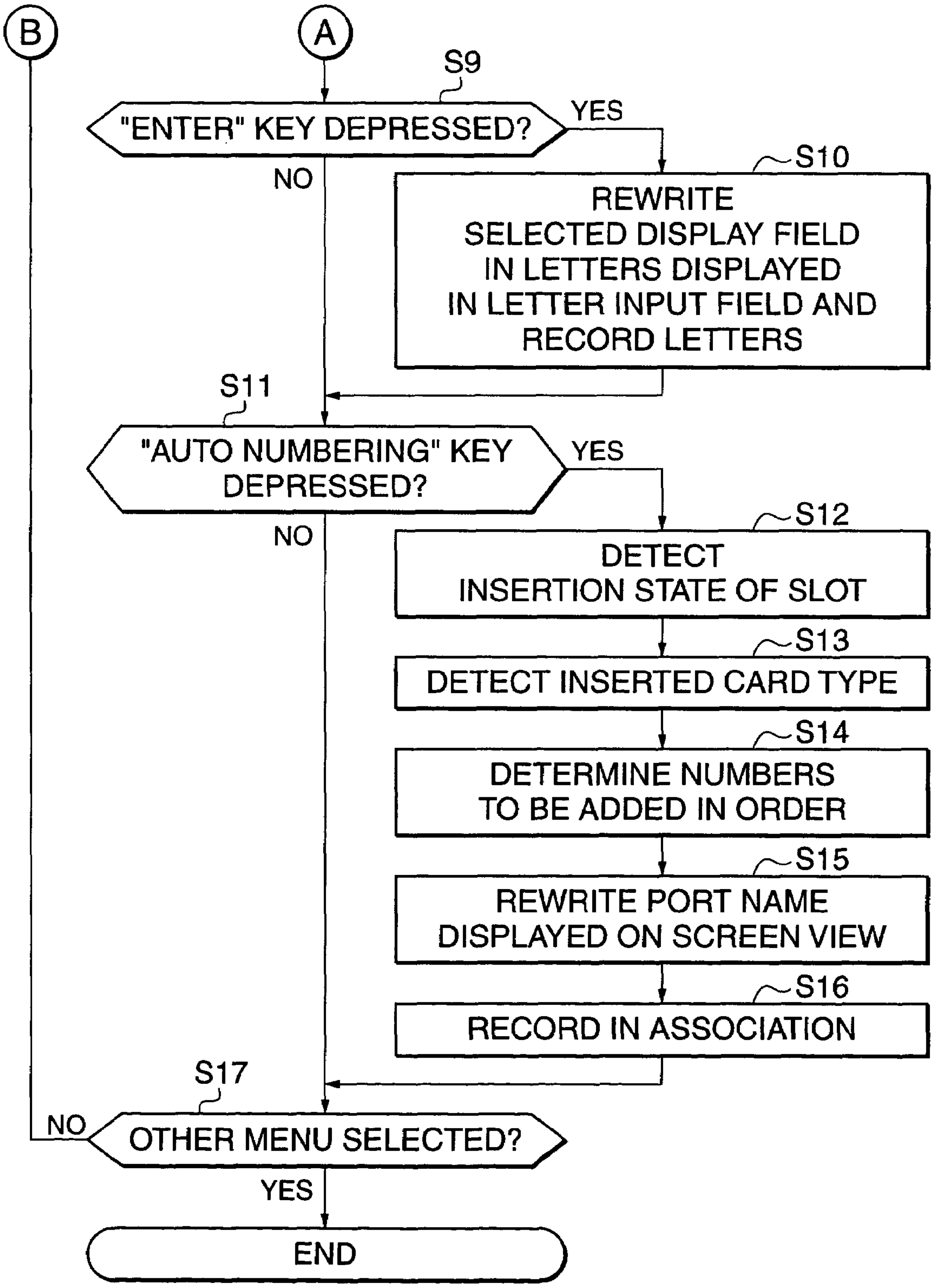
Figure 5:
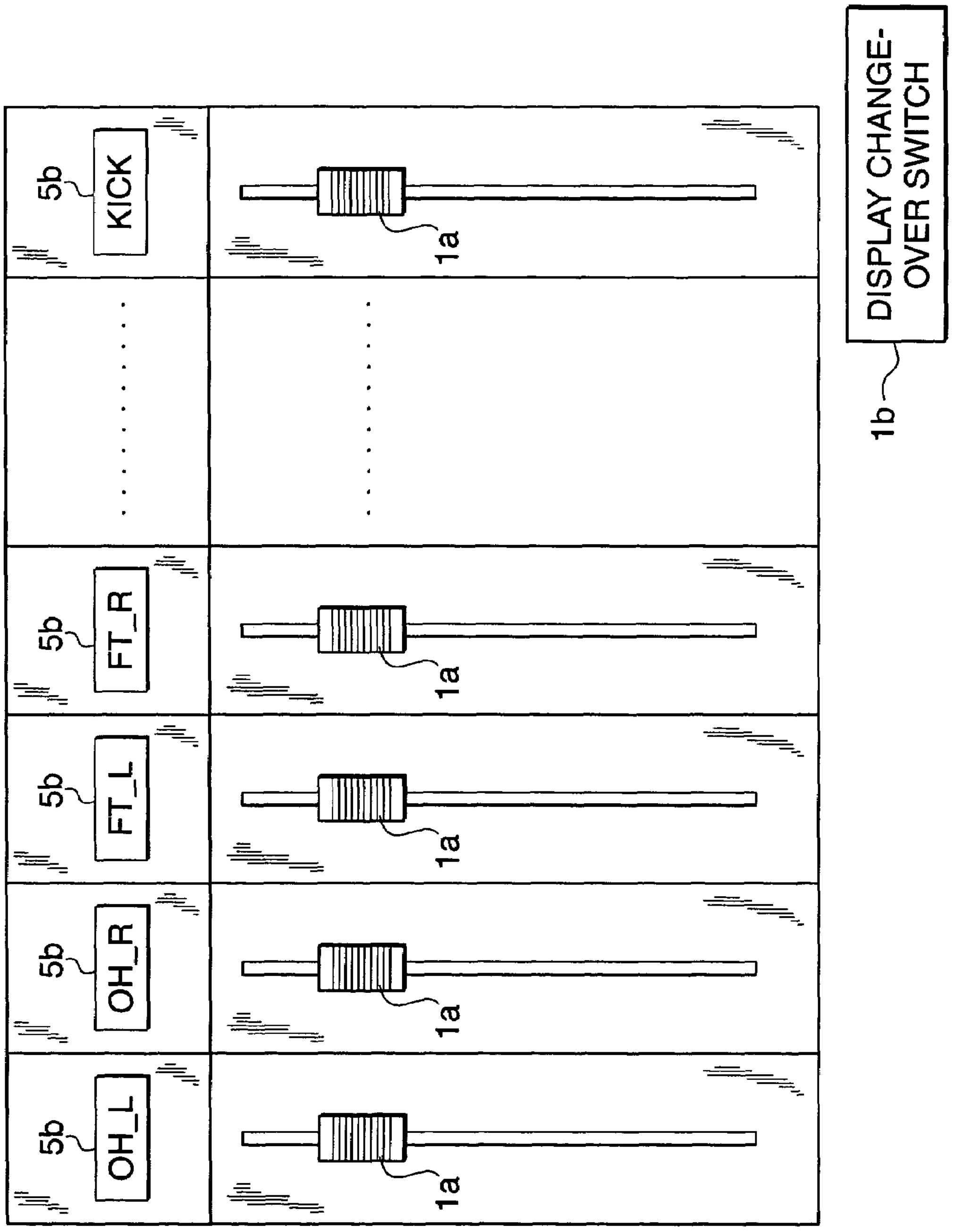
FIG. 5 is a view useful in explaining a control process using a display switching function.

Referring to FIGS. 3 to 5, a description will now be given of a control process that is carried out by the signal processing apparatus constructed as above.

The signal processing apparatus according to the present embodiment has at least five functions as follows:

(1) a unit naming function of giving names designated by the user to effective ones of the input units 8 and the output units 11;

(2) a port naming function of giving names designated by the user to effective ones of the input ports and the output ports;

(3) an auto numbering ("AUTO NUMBERING") function of automatically numbering effective ones of the input ports and the output ports;

(4) a channel naming function of giving names designated by the user to effective channels; and (5) a display switching function of selectively switching display of the names of channels given by the above (4) channel naming function and the names of ports via which signals assigned to the channels are input or output.

Here, "effective" ones of the input units 8 mainly mean the input units connected to the input connectors 9, but if it is configured such that the input units connected to the input connectors 9 can be made ineffective using software or the like, "effective" ones of the input units 8 mean the input units which have not been made ineffective. This also applies to "effective" ones of the output units 11.

Further, "effective" ones of the input ports mainly mean that the input cards provided with such effective input ports are inserted into the slots of the "effective" input units 8. However, even if the input cards are inserted into the slots of the "effective" input units 8, if it is configured such that the ports can be made ineffective using software or the like, "effective" ones of the input ports mean the input ports which have not been made ineffective. This also applies to "effective" ones of the output ports.

Further, "effective" ones of the channels mainly mean the channels to which signals are assigned, but if it is configured such that the channels to which signals are assigned can be made ineffective, "effective" one of the channels mean the channels which have not been made ineffective.

Next, the above functions (1) to (5) will be described in this order.

FIG. 3 is a view showing an example of a screen view for giving various kinds of names, which is displayed on the display device 5. A screen view 5*a* in FIG. 3 shows a state in which the first unit (IN1) among the plurality of input units 8 is named, i.e. a state in which the above unit naming function (1) is selected and executed.

First, when the user points a cursor C to the first unit (IN1) among the plurality of input units 8 displayed in a "UNIT SELECT" field, and then carries out a predetermined operation (e.g. click operation n), an "IN1" section 5*a*1 is highlighted, and information on the selected unit is displayed in the form of a list in a display region 5*a*2.

Next, when the user points the cursor C to a "UNIT NAME" field 5*a*3 and then clicks, the "UNIT NAME" field 5*a*3 is highlighted (hatched in FIG. 3).

Then, when the user inputs his/her desired letters by designating the corresponding keys of a displayed keyboard 5*a*5 by the cursor C, the letters are displayed in a letter input field 5*a*4 (the word "SOURCE" is input and displayed in the illustrated example). When the user points the cursor C to an "ENTER" key 5*a*6 and then clicks, the letters displayed in the letter input field 5*a*4 are shifted into the "UNIT NAME" field 5*a*3 highlighted as described above and stored as a unit name in the flash memory 3.

FIGS. 4A-4B are flow chart showing a naming process that is carried out by the signal processing apparatus according to the present embodiment, and more particularly by the CPU 2. This naming process realizes the above described functions (1) to (3), i.e. the unit naming function, the port naming function, and the auto numbering function. It should be noted that the naming process is comprised of processing (step S1→step S2) in which in response to selection of a unit by the user, information on the selected unit is read out from the flash memory 3 and displayed in the display region 5*a*2 on the screen view 5*a*, and processing (step S17→"end") in which the naming process is terminated when a predetermined condition is satisfied, i.e. when the user has selected another menu.

In the flow chart of FIGS. 4A-4B, the unit naming function is realized by steps S4, S8, and S10. Specifically, when the user selects the "UNIT NAME" field 5*a*3, the "UNIT NAME" field 5*a*3 is highlighted to prepare for naming (step S3→step S4), and when the user inputs letters representative of a name to be given via the keyboard 5*a*5 appearing in FIG. 3, the letters are displayed in the letter input field 5*a*4 appearing in FIG. 3 (step S7 →step S8). In this state, when the user depresses the "ENTER" key 5*a*6 appearing in FIG. 3, the letters displayed in the letter input field 5*a*4 are shifted into the "UNIT NAME" field 5*a*3, so that the "UNIT NAME" field 5*a*3 is rewritten and the input "unit name" is stored in the flash memory 3 (step S9→step S10).

In this way, by giving names which represent, for example, the functions of the respective units, the unit naming function enables the functions of the respective units to be recognized at a glance.

Referring again to FIG. 3, the control process using the above port naming function (2) differs from the control process using the unit naming function only in that the port desired to be named is selected using the cursor C.

In the flow chart of FIGS. 4A-4B, the port naming function is realized by steps S6, S8, and S10. Specifically, when the user selects his/her desired port to be named from among a list of ports displayed in the display region 5*a*2 appearing in FIG. 3, a field where the name of the selected port is displayed (i.e. a port name display field) is highlighted to prepare for naming (step S5→step S6), and when the user inputs letters representative of a name to be given via the keyboard 5*a*5, the letters are displayed in the letter input field 5$a$4 appearing in FIG. 3 (step S7→step S8). In this state, when the user depresses the "ENTER" key 5$a$6 appearing in FIG. 3, the letters displayed in the letter input field 5$a$4 are shifted into the port name display field, so that what is displayed in the port name display field is rewritten and the input "port name" is stored in the flash memory 3 (step S9→step S10).

Referring again to FIG. 3, the above auto numbering function (3) enables the user to automatically number all the effective input ports and output ports from the first one by depressing an "AUTO NUMBERING" key 5$a$7 with the cursor C. The conditions (such as the number and arrangement) of input ports vary according to input units 8 connected to input connectors 9 (i.e. an input unit 8 is not necessarily connected to each input connector 9), and input cards inserted into input units 8 (i.e. an input card is not necessarily inserted into each slot of the input units 8 connected to the input connectors 9). Similarly, the conditions of output ports vary according to output units 11 connected to output connectors 10 and output cards inserted into output units 11. According to the auto numbering function, only the effective ports, i.e. the ports (input ports and output ports) of the inserted cards (input cards and output cards), which are actually functioning, are sequentially numbered from the first one. Therefore, if there are units that are unconnected or if there are units that are connected but cards are not inserted into part or all of the units, the actually existing ports are sequentially numbered as in a screen view example 100 illustrated in FIG. 3

In the flow chart of FIGS. 4A-4B, the auto numbering function is realized by steps S12 to S16. Specifically, when the user depresses the "AUTO NUMBERING" key 5$a$7, the conditions (insertion conditions) of the cards (input cards and output cards) inserted into the respective slots of the input units 8 and the output units 11 connected to the input connectors 9 and the output connectors 10 are detected first (step S11→step S12), and then the types of the inserted cards are detected (step S13). Numbers to be sequentially given are then determined (step S14), the port name display field displayed in the display region 5$a$2 of the screen view 5$a$ is rewritten with the numbers determined in the step S14 (step S15), and the determined numbers are stored in a manner associated with the respective ports in the flash memory 3 (step S16).

As described above, according to the auto numbering function, effective ones of the ports included in all the input units 8 and the output units 11 are numbered, i.e. effective ports are simply sequentially numbered, with information on the physical positions of the respective ports being excluded, and hence the optimum port name for processing to be performed on each signal can be given.

Although in the present embodiment, effective ones of the ports included in all the units, i.e. all the connected input units 8 and output units 11 are numbered using the auto numbering function, the present invention is not limited to this, but effective ones of the ports included in either all the input units 8 or all the output units 11 may be numbered. Alternatively, effective ones of the ports may be numbered for each input unit 8 or output unit 11, or effective ones of the ports may be numbered for each input card or output card.

Further, numeric numbers should not necessarily be used for numbering, but any symbols (such as alphabets) may be used insofar as they are in sequence. Further, the types of the cards detected in the step S13 may be additionally numbered. Specifically, assuming that "0005" is given to a certain port, if a card having this port is adapted to receive an analog signal and convert it to a digital signal, "ADin" for example is put in front of or behind "0005" such that the card is numbered with "ADin0005" or "0005ADin". It goes without saying that if it is configured such that the type of each port can be detected, the type may be added per port.

The above channel naming function (4) is for displaying a screen view, which is similar to the screen view appearing in FIG. 3 and is used for giving channel names. When the user inputs his/her desired letters by designating the corresponding keys of a displayed keyboard with a cursor, the input letters are registered as a channel name.

FIG. 5 is a view useful in explaining a control process that is carried out using the above display switching function (5).

As shown in FIG. 5, small liquid crystal panels 5$b$ are provided in a manner being associated with respective faders 1$a$ so that the names of channels assigned to the respective faders 1$a$ can be displayed. In the present embodiment, one channel and one fader 1$a$ are associated with each other, and hence they can be equated with each other. Of course, the present invention is not limited to this, but the number of faders may be smaller than the number of channels, and for example, one fader may control a plurality of channels through the operation of a switch.

Contents displayed on the small liquid crystal panels 5$b$ can be changed by the user operating a display change-over switch 1$b$. For example, in response to each depression of the display change-over switch 1$b$, the names of channels and ports via which signals assigned to the respective channels are input or output are alternately displayed. Here, the names which are given using the above port naming function (2) are usually displayed as the names of ports, but in a case where the ports are automatically numbered using the above auto numbering function (3), numbers are displayed since the names which are given using the port naming function are rewritten.

In this way, the display switching function enables channels and terminals corresponding to signals assigned to the channels to be recognized at a glance.

Although in the present embodiment, the user gives names to the respective units or ports, the user may also gives names to the respective cards. Further, a name may be collectively given to a plurality of units, cards, or ports.

Figure 6:
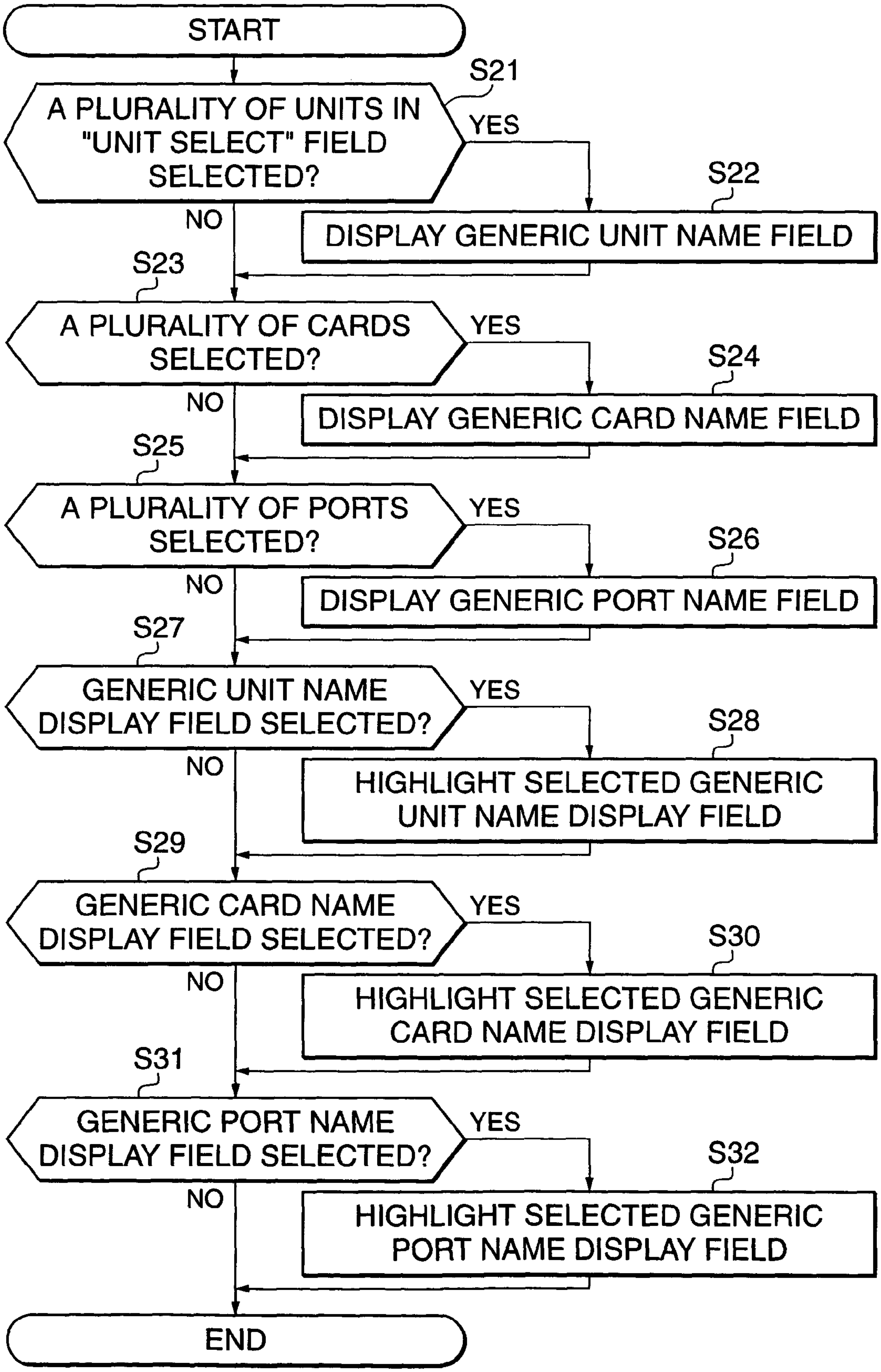
FIG. 6 is a flow chart showing part of a naming process for giving generic names of a plurality of units, a plurality of cards, or a plurality of ports, according to a second embodiment of the present invention.

FIG. 6 is a flow chart showing part of a naming process for giving generic names of a plurality of units, a plurality of cards, or a plurality of ports, according to a second embodiment of the present invention. This part of the naming process is inserted between the step S11 and the step S17 in FIGS. 4A-4B. As shown in FIG. 6, when the user selects a plurality of units displayed in the "UNIT SELECT" field using the cursor C, a generic unit name filed, not show, is highlighted (step S27→step S28). Then, as mentioned before, keys of the displayed keyboard 5$a$5 are designated using the cursor C, and corresponding letters are displayed in the letter input field 5$a$4. Then, if the user points the cursor C to the "ENTER" key 5$a$6 and clicks, the letters in the letter input field 5$a$4 are moved into the highlighted generic unit name field, so that the "generic unit name" is stored in the flash memory 3 (step S7→S8→S9→S10 in FIGS. 4A-4B). Generic names can be given to a plurality of cards or a plurality of ports in the same manner as described above.

Further, although in the present embodiment, it is configured such that names given to the respective ports are confirmed only on the screen view 5$a$ appearing in FIG. 3, it may be configured such that a panel such as the small liquid crystal panel 5$b$ appearing in FIG. 5 is provided in the vicinity of each port, so that a name given to each port can be displayed in association with the actual existing port.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

The storage medium for supplying the program code is not limited to a ROM, and a floppy (registered trademark) disk, a hard disk, an optical disk, a magnetic-optical disk, a CD-ROM, a CD-R, a CD-RW, a DVD-ROM, a DVD-RAM, a DVD−RW, a DVD+RW, a magnetic tape, a nonvolatile memory card, and a download carried out via MIDI equipment or a communication network may be used.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments thereof may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A signal processing apparatus comprising:

a main body;

an input terminal group comprising a plurality of input terminals via which a plurality of kinds of signals are externally input;

a signal processing device that performs processing on the plurality of kinds of signals externally input via said input terminal group to thereby generate a signal for at least one channel;

an output terminal group comprising a plurality of output terminals via which the signal for the at least one channel generated by said signal processing device is externally output;

a plurality of input terminal set devices including said input terminal group and a plurality of output terminal set devices including said output terminal group, said plurality of input terminal set devices and said plurality of output terminal set devices being removably attached to said main body; and a numbering device that detects the attached conditions of said plurality of input terminal set devices and said plurality of output terminal set devices, and automatically numbers, in sequential order, a plurality of effective terminals included in at least one of said input terminal set devices attached to said main body and said output terminal set devices attached to said main body.

2. A signal processing apparatus according to claim 1, wherein the plurality of effective terminals comprise terminals that are enabled to actually perform external inputting of signals or external outputting of signals.

3. A signal processing apparatus according to claim 1, further comprising a display device that displays results of numbering by said numbering device.

4. A signal processing apparatus comprising:

a main body;

an input terminal group comprising a plurality of input terminals via which a plurality of kinds of signals are externally input;

an assigning device that assigns each of the plurality of kinds of signals input via said input terminal group to one input channel;

a signal processing device that performs processing on signals assigned to a plurality of input channels by said assigning device to thereby generate a signal for at least one output channel;

an output terminal group comprising a plurality of output terminals via which the signal for the at least one output channel generated by said signal processing device is externally output;

a channel naming device that gives names to respective ones of the input channels or output channels;

a display device that displays the names given by said channel naming device in a manner being associated with respective ones of the input channels or output channels;

a display control device that provides control such that the names given by said terminal naming device to the effective terminals, and the names given to the input channels or output channels by said channel naming device are switchably displayed on said display device;

a plurality of input terminal set devices including said input terminal group and a plurality of output terminal set devices including said output terminal group, said plurality of input terminal set devices and said plurality of output terminal set devices being removably attached to said main body; and a terminal naming device that detects the attached conditions of said plurality of input terminal set devices and said plurality of output terminal set devices, and automatically gives names, in sequential order, to a plurality of effective terminals included in at least one of said input terminal set devices attached to said main body and said output terminal set devices attached to said main body such that the terminals are distinguished from each other by the names.

5. A signal processing apparatus according to claim 4, wherein said terminal naming device gives names designated by a user to the effective terminals.

6. A signal processing apparatus comprising:

a main body;

an input terminal group comprising a plurality of input terminals via which a plurality of kinds of signals are externally input;

a signal processing device that performs processing on the plurality of kinds of signals input via said input terminal group to thereby generate a signal for at least one channel;

an output terminal group comprising a plurality of output terminals via which the signal for the at least one channel generated by said signal processing device is externally output;

a display device that displays the names given by said naming device;

a plurality of input terminal set devices including said input terminal group, and a plurality of output terminal set devices including said output terminal group, said plurality of input terminal set devices and said plurality of output terminal set devices being removably attached to said main body; and a naming device that detects the attached conditions of said plurality of input terminal set devices and said plurality of output terminal set devices, and gives generic names to respective ones of said input terminal set devices attached to said main body and said output terminal set devices attached to said main body.

7. A method of controlling a signal processing apparatus which comprises an input terminal group comprising a plurality of input terminals via which a plurality of kinds of signals are externally input, a signal processing device that performs processing on the plurality of kinds of signals externally input via the input terminal group to thereby generate a signal for at least one channel, an output terminal group comprising a plurality of output terminals via which the signal for the at least one channel generated by the signal processing device is externally output, said signal processing apparatus further comprises a main body, a plurality of input terminal set devices including said input terminal group, and a plurality of output terminal set devices including said output terminal group, said plurality of input terminal set devices and said plurality of output terminal set devices being removably attached to said main body, the method comprising:

a step of detecting the attached conditions of said plurality of input terminal set devices and said plurality of output terminal set devices, and automatically numbers, in sequential order, a plurality of effective terminals included in at least one of said input terminal set devices attached to said main body and said output terminal set devices attached to said main body.

8. A method of controlling a signal processing apparatus which comprises an input terminal group comprising a plurality of input terminals via which a plurality of kinds of signals are externally input, an assigning device that assigns each of the plurality of kinds of signals input via the input terminal group to one input channel, a signal processing device that performs processing on signals assigned to a plurality of input channels by the assigning device to thereby generate a signal for at least one output channel, and an output terminal group comprising a plurality of output terminals via which the signal for the at least one output channel generated by the signal processing device is externally output, said signal processing apparatus further comprises a main body, a plurality of input terminal set devices including said input terminal group, and a plurality of output terminal set devices including said output terminal group, said plurality of input terminal set devices and said plurality of output terminal set devices being removably attached to said main body, the method comprising:

a channel naming step of giving names to respective ones of the input channels or output channels;

a display step of displaying the names given in said channel naming step on a display device in a manner being associated with respective ones of the input channels or output channels; and a display control step of providing control such that the names given in said terminal naming step to the effective terminals, and the names given to the input channels or output channels in said channel naming step are switchably displayed on said display; and a detecting step detecting the attached conditions of said plurality of input terminal set devices and said plurality of output terminal set devices, and automatically gives names, in sequential order, to a plurality of effective terminals included in at least one of said input terminal set devices attached to said main body and said output terminal set devices attached to said main body such that the terminals are distinguished from each other by the names.

9. A method of controlling a signal processing apparatus which comprises an input terminal group comprising a plurality of input terminals via which a plurality of kinds of signals are externally input, a signal processing device that performs processing on the plurality of kinds of signals input via the input terminal group to thereby generate a signal for at least one channel, an output terminal group comprising a plurality of output terminals via which the signal for the at least one channel generated by the signal processing device is externally output, said signal processing apparatus further comprises a main body, a plurality of input terminal set devices including said input terminal group, and a plurality of output terminal set devices including said output terminal group, said plurality of input terminal set devices and said plurality of output terminal set devices being removably attached to said main body, the method comprising:

a display step of displaying the names given in said naming step on a display device; and a detecting step of detecting the attached conditions of said plurality of input terminal set devices and said plurality of output terminal set devices, and gives generic names to respective ones of said input terminal set devices attached to said main body and said output terminal set devices attached to said main body.

10. A computer-readable storage medium including a program for causing a computer to execute a method of controlling a signal processing apparatus which comprises an input terminal group comprising a plurality of input terminals via which a plurality of kinds of signals are externally input, a signal processing device that performs processing on the plurality of kinds of signals externally input via the input terminal group to thereby generate a signal for at least one channel, an output terminal group comprising a plurality of output terminals via which the signal for the at least one channel generated by the signal processing device is externally output, said signal processing apparatus further comprises a main body, a plurality of input terminal set devices including said input terminal group, and a plurality of output terminal set devices including said output terminal group, said plurality of input terminal set devices and said plurality of output terminal set devices being removably attached to said main body, the method comprising:

a step of detecting the attached conditions of said plurality of input terminal set devices and said plurality of output terminal set devices, and automatically numbers, in sequential order, a plurality of effective terminals included in at least one of said input terminal set devices attached to said main body and said output terminal set devices attached to said main body.

11. A computer-readable storage medium including a program for causing a computer to execute a method of controlling a signal processing apparatus which comprises an input terminal group comprising a plurality of input terminals via which a plurality of kinds of signals are externally input, an assigning device that assigns each of the plurality of kinds of signals input via the input terminal group to one input channel, a signal processing device that performs processing on signals assigned to a plurality of input channels by the assigning device to thereby generate a signal for at least one output channel, and an output terminal group comprising a plurality of output terminals via which the signal for the at least one output channel generated by the signal processing device is externally output, said signal processing apparatus further comprises a main body, a plurality of input terminal set devices including said input terminal group, and a plurality of output terminal set devices including said output terminal group, said plurality of input terminal set devices and said plurality of output terminal set devices being removably attached to said main body, the method comprising:

a channel naming step of giving names to respective ones of the input channels or output channels;

a display step of displaying the names given in said channel naming step on a display device in a manner being associated with respective ones of the input channels or output channels; and a display control step of providing control such that the names given in said terminal naming step to the effective terminals, and the names given to the input channels or output channels in said channel naming step are switchably displayed on said display device; and a detecting step detecting the attached conditions of said plurality of input terminal set devices and said plurality of output terminal set devices, and automatically gives names, in sequential order, to a plurality of effective terminals included in at least one of said input terminal set devices attached to said main body and said output terminal set devices attached to said main body such that the terminals are distinguished from each other by the names.

12. A computer-readable storage medium including a program for causing a computer to execute a method of controlling a signal processing apparatus which comprises an input terminal group comprising a plurality of input terminals via which a plurality of kinds of signals are externally input, a signal processing device that performs processing on the plurality of kinds of signals input via the input terminal group to thereby generate a signal for at least one channel, an output terminal group comprising a plurality of output terminals via which the signal for the at least one channel generated by the signal processing device is externally output, said signal processing apparatus further comprises a main body, a plurality of input terminal set devices including said input terminal group, and a plurality of output terminal set devices including said output terminal group, said plurality of input terminal set devices and said plurality of output terminal set devices being removably attached to said main body, the method comprising:

a display step of displaying the names given in said naming step on a display device; and a detecting step of detecting the attached conditions of said plurality of input terminal set devices and said plurality of output terminal set devices, and gives generic names to respective ones of said input terminal set devices attached to said main body and said output terminal set devices attached to said main body.

* * * * *